United States Patent [19]

ter Meulen

[11] Patent Number: 4,465,402

[45] Date of Patent: Aug. 14, 1984

[54] METHOD FOR REMOVING UNDESIRED COMPONENTS FROM THE SOIL

[75] Inventor: Berend P. ter Meulen, Loenen, Netherlands

[73] Assignee: Nederlandse Centrale Organisatie voor Toegepast Natuurwetenschappelijk Onderzoek, The Hague, Netherlands

[21] Appl. No.: 350,349

[22] Filed: Feb. 19, 1982

[51] Int. Cl.³ .............................................. C09K 17/00
[52] U.S. Cl. ................................. 405/264; 166/305 R; 405/263
[58] Field of Search .................. 166/285, 267, 305 R; 299/4, 5; 405/258, 263, 264, 128, 130

[56] References Cited

U.S. PATENT DOCUMENTS

| 3,157,231 | 11/1964 | Darley | 299/5 X |
|---|---|---|---|
| 3,350,888 | 11/1967 | Shrier | 405/130 |
| 3,425,555 | 2/1969 | Ridgeway | 405/258 |
| 3,815,957 | 6/1974 | Spedden et al. | 299/5 |
| 3,908,387 | 9/1975 | Nakamura | 405/263 |
| 3,998,492 | 12/1975 | Lambly et al. | 299/5 X |
| 4,167,973 | 9/1979 | Forte et al. | 166/267 |
| 4,255,067 | 3/1981 | Wright | 405/258 X |
| 4,289,354 | 9/1981 | Zakiewicz | 299/4 |
| 4,311,340 | 1/1982 | Lyons et al. | 299/4 |
| 4,344,650 | 8/1982 | Pinsky | 299/4 |

FOREIGN PATENT DOCUMENTS

| 1278579 | 6/1972 | United Kingdom | 405/258 |
|---|---|---|---|
| 650653 | 3/1979 | U.S.S.R. | 405/258 |
| 773206 | 10/1980 | U.S.S.R. | 405/258 |

Primary Examiner—George A. Suchfield
Attorney, Agent, or Firm—Armstrong, Nikaido, Marmelstein & Kubovcik

[57] ABSTRACT

A method for removing undesired components from the soil which comprises screening adjacent soil from the contaminated soil having the undesired components therein, supplying an extracting agent, suitable for removing the undesired components, to the soil at a level either above or below the contaminated soil, and removing the extracting agent having the undesired components therein from the soil at a level on the other side of the contaminated soil.

11 Claims, 4 Drawing Figures

METHOD FOR REMOVING UNDESIRED COMPONENTS FROM THE SOIL

BACKGROUND OF THE INVENTION a. Field of the Invention

The present invention relates to a method for removing undesired components from the soil.

b. Description of the Prior Art

For a long time little or no attention has been paid to the consequences of dumping industrial waste, whether or not in special designated areas. In recent decennium increasing attention has been paid thereo. Attention was in the first place paid to pollution of surface waters, such as rivers (especially the Rhine), lakes, such as the Great Lakes in the U.S.A., and also oceans and seas, in which latter case the pollutant is primarily oil. Of more recent date, attention has been paid to pollution of the soil by undesired components. Such components, which usually are poisonous for certain plants and/or animals, have been tackled in various manners, but none of the methods proposed hitherto have provided an attractive solution of the problem from the viewpoint of costs and logistics.

The most common method comprises digging of and digging out the polluted soil, which subsequently is dumped in an area specially designed for that purpose, or is treated. This usually requires transportation of large volumes of soil over relatively long distances, as far as the contaminated soil is concerned, as well as the supply of "clean" soil for refilling. The latter equally implies transportation of large volumes, though the distance may be relatively small under favorable conditions.

Another method comprises the immobilisation of the undesired components of the waste in the soil. As example to be mentioned is chemical bonding of heavy metals with chelateforming ion-exchanging resins, such as described in Dutch patent application No. 7508582. However, the heavy metals will still exert a toxic action.

Such heavy metals may also be bonded with a mercapto-s-triazine, such as mono-, di- or trimercapto-s-triazine, by adding that as such or in the form of a watersoluble salt to the soil, such as is described in Dutch patent application No. 7211368. In those cases the impurities remain in the soil in the bonded state into which they have been converted. Thus, there are no longer or at least to a much lesser extent detrimental.

In addition, many methods are known for introducing all kinds of materials into the soil, in particular fertilizers and other growth-promoting materials, as well as agents for preventing or combating diseases and soil strengthening means, but the removal of undesired components from the soil can not be derived therefrom.

SUMMARY OF THE INVENTION

The inventor of the present invention has found that the above mentioned disadvantages can be mitigated or avoided.

It is a primary object of the invention to provide a method for removing undesired components from the soil without taking recourse to massive soil transportation.

It is a further object of the invention to provide a method for removing undesired components from the soil by extracting the contaminated soil with an appropriate solvent for the relevant components while screening from at least the adjacent soil, whereafter the extract thus formed is removed in a known manner as such. Thus, a horizontal spreading of the undesired components is prevented. Depending on the structure of the soil and the level of the groundwater, it may be desirable to install also a horizontal screening with respect to the underlying soil in order to prevent vertical spreading towards the groundwater.

It is a still further object of the invention to provide a method for removing undesired components from the soil by transporting at least part of the contaminated soil to a nearby area, similarly screened from the adjacent soil and if desired also the underlying soil, usually in the form of a hole having the required dimensions for accepting all or at least part of the contaminated soil, followed by extracting said contaminated soil with an appropriate solvent for the relevant components.

BRIEF DESCRIPTION OF THE DRAWINGS

The foregoing and other objects and advantages of the invention will become more readily apparent from the following description of the preferred embodiment of the method according to the invention, as taken in conjunction with the accompanying drawings, which are part hereof and wherein.

DESCRIPTION OF THE PREFERRED EMBODIMENT

Figure 1:
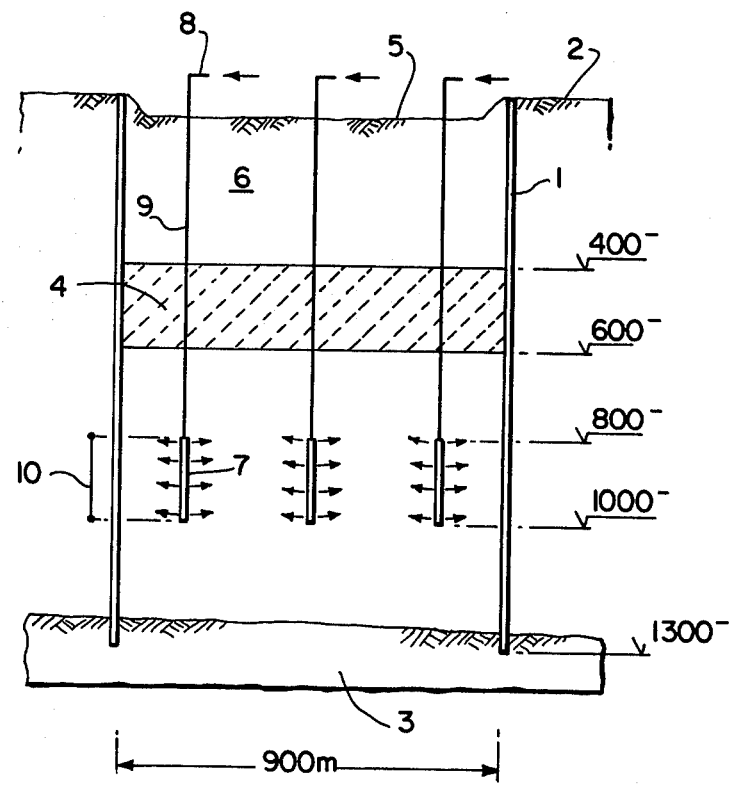
FIG. 1 represents a vertical cross-section of a screened off section of contaminated soil, with surrounding soil and with sources.

In the preferred embodiment of the method according to the invention as shown in FIG. 1, a waterimpervious screen 1 extends vertically from the ground level as far as into a waterimpervious layer 3 around the contaminated layer 4 which is to be extracted. Within the waterimpervious screen 1, the top soil is removed down to the upper ground layer 5. Within the space 6, thus confined, sources 7 are installed at a suitable mutual distance, consisting of a supply conduit 8, extending vertically through the contaminated layer 4 as tube 9, which is provided at the end with outlet filters 10. In the embodiment shown, the contaminated layer is about 4–6 m below ground level, the outlet filters are 8–10 m below ground level, the diameter of the contaminated layer 4 is about 9 m and the horizontal water impervious layer 3 is at about 13 m. Through supply conduit 8 the desired extracting agent is introduced into the soil under pressure through the outlet filters, whereafter the extracting agent emerges at the top and can be reused by pumping off and purifying. The sources are at a mutual distance of 3 m, heart to heart, the total volume of extracting agent introduced amounts to 100–500 l/m$^2$/day at an excess pressure of 2–3 m water pressure. This method is in particular suitable when the contaminants are lighter than water.

Figure 2:
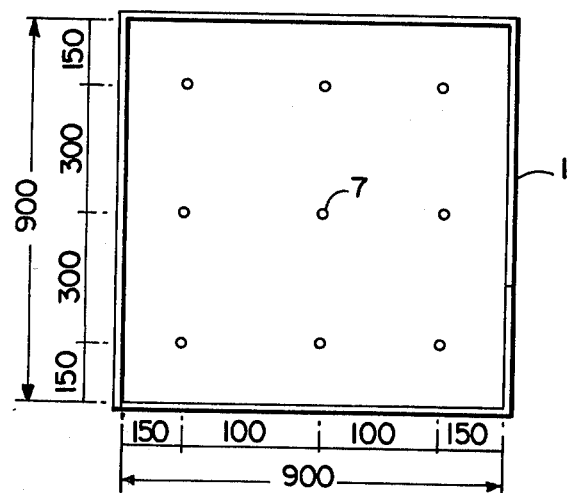
FIG. 2 represents a horizontal cross-section of FIG. 1 at the level of the outlet filters, shown therein.

FIG. 2 shows how the waterimpervious screen 1 is laid out and how the sources 7 are located with respect to this screen and to each other.

Figure 3:
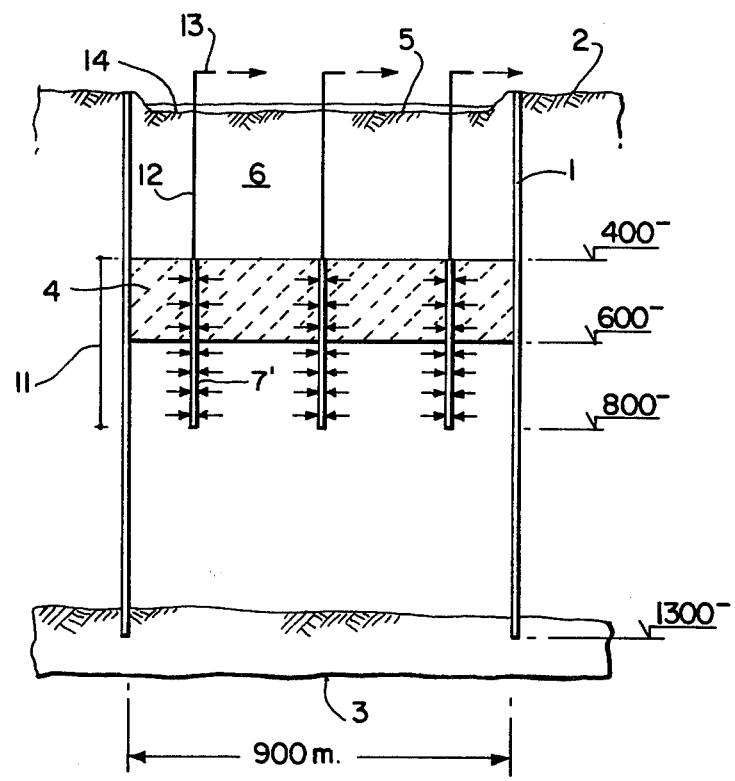
FIG. 3 represents a vertical cross-section of a screened off section of contaminated soil, with surrounding soil, and with wells.

As alternative embodiment is shown in FIG. 3 for a reverse path of the extracting agent with a similar waterimpervious screen 1, ground level 2, waterimpervious layer 3, contaminated layer 4 and top soil 5. Within the thus confined space 6, wells 7' are installed at a suitable mutual distance, consisting of suction filters 11, rising tube 12 and outlet tube 13, which is connected to a pump (not shown). In the embodiment as shown the contaminated layer is from 4 to 6 m below the ground level, the suction filters are 4-8 m below the ground level, the diameter of the contaminated layer 4 is about 9 m and the horizontal waterimpervious layer 3 is at about 13 m below the ground level. The extracting agent 14 is applied onto the upper ground level 5 as irrigation, descends into the underlying soil and is retrieved, together with the contaminants, dissolved therein, through the suction filters 11 and is then treated in a similar manner as described for the embodiment of the method of FIG. 1. The wells are at a mutual distance of 3 m heart to heart, and the total volume of extracting agent amounts to 100-500 l/m²/day. This method has the advantage that a possible rise of the groundwater in the area to be purified, can be repressed.

Figure 4:
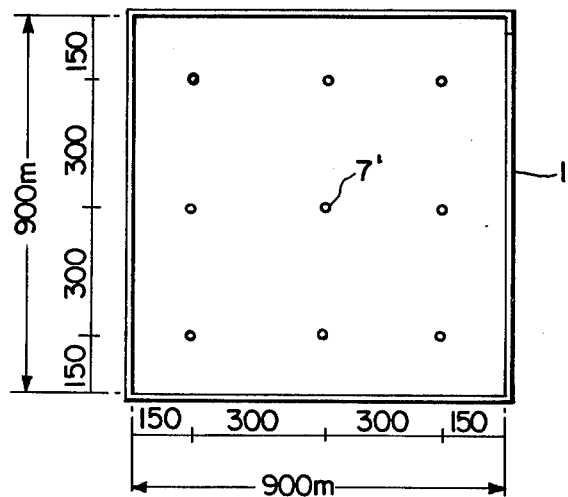
FIG. 4 represents a horizontal cross-section of FIG. 3 at the level of the wells, shown therein.

FIG. 4 shows how the waterimpervious screen 1 in FIG. 3 is laid out and how the wells 7'0 are located with respect to this screen and to each other.

By screening of the contaminated soil from adjacent soil and if desired underlying soil, diffusion of contaminating components into the adjacent, and possibly also the underlying soil is prevented, whereafter the removal of the contaminating components may be carried out in a period of time adjusted to the circumstances, depending on the character of the contaminating components, and if desired the start of this treatment may be deferred for a considerable time.

The screening required for the method according to the invention has to be completely or at least substantially impervious for the components to be removed, as well as the extracting agent used or the extracting agents used. Such a screening may for example consist of a damwall, which can serve as such for many years. If desired this wall may be provided at the exterior with a draining system for collecting any water and/or other extracting agent that may ooze through the damwall and removal thereof. If desired the damwall may also be provided with a lining of a suitable foil, inert under the prevailing conditions so as to provide a complete covering, inert material. Such a lining may be fitted onto the inside and/or the outside of a damwall. Instead of a damwall of the customary U-shaped plates, a clay-screen of customary composition, for example on the basis of bentonite, may also, and preferably, be applied. Such a wall will harden at the spot and turns completely impervious to water. Such clay walls may be installed by initially making a groove of the desired width, for example 10 cm, followed by filling in of the groove with the selected clay mixture.

The sideways screening should extend beyond the lower limit of the contaminated soil. This usually requires a side-wall up to a depth of 10-15 m below the ground level.

When the conditions do not exclude oozing into the ground water, it may be desirable to insert a horizontal screen. Such a horizontal screen may equally be made of a suitable clay mixture according to known methods as such. Instead, such a horizontally extending screen may also be formed by freezing, such as is described for example in Civil Engineering, December 1977, p. 53 ff.

In this context, it should be observed that the vertical screen may be formed by freezing as well. It will be understood, that on applying freezing of soil for the formation of the complete screen or a part thereof, the amount of cooling applied should be such, that the screen thus formed will not show essential interruptions during the complete treatment of the soil, as otherwise the screening function would get or at least lost in part. Since considerable energy is required for cooling in order to maintain the freezing, as well as supervision to ascertain a proper functioning thereof, it is preferable to use a static screen, one that does not require supervision.

After screening the contaminated soil from the adjacent soil in the manner as described above, and if desired from the underlying soil, the extraction according to the invention is carried out. Depending on the type of the undesired components, a suitable extracting agents for these may be used. As examples of extracting agents suitable for use in the method according to the invention, there may be mentioned aqueous and organic solvents, such as water (if desired with decreased or increased pH), alcohols, such as for example ethanol and butanol, mixtures of alcohol and water, and petroleum ether. Depending on the type of the extractant and the type of the contaminant, the presence of a surfaceactive agent may affect the extraction in a positive way. In selecting the extracting agent to be used, it is of importance that the relevant extracting agent can be removed in an easy way and completely or at least substantially completely from the treated soil, or, if the latter is not possible, that it will exert no detrimental action in the purified soil.

The relevant extracting agent can be introduced onto or into the contaminated soil in any suitable manner such as, for example, by sprinkling or by injecting. Depending on the type of the extracting agent used, it will either drain into the contaminated soil towards lower layers and be sucked off from there by means of outlet ports destined for that purpose, such as for example by means of pumps, or alternatively the extracting agent, together with the contaminants dissolved therein, will rise towards the draining means, provided above the contaminated soil, under the influence of the suction action of the pumps. In the first case the extracting agent is supplied above the contaminated soil, either by sprinkling or by injecting into a layer located above the contaminated soil, or even into the contaminated soil; whereas in the second case, the extracting agent is injected into a layer below the contaminated soil and if desired also in part into the contaminated soil. In order to bring about the intended extraction, it is a suitable embodiment to install in the contaminated area sources or wells for every 5 to 10 m², each having a length of 5-10 m, depending on the permeability of the soil. When the extraction is carried out by irrigating with a suitable extracting agent, in a lower located layer water together with extract are withdrawn from the soil through the wells. In the other case, extracting agent is pressed into the soil from the sources. Subsequently, the extracting agent reaches the surface of the soil and is pumped off from there for further treatment. When volatile extracting agents are used, it is advisable to cover the surface to be treated with a material that is impervious for the vapor of the extracting agent, so that as little as possible extracting agent is lost by evaporation.

If the soil is impervious, the contaminants will be close to or even at the surface, and will not penetrate into the soil towards a lower level. In such cases the contaminants may easiestly be removed by removal of a relatively thin surface layer. However, this will only be required in a limited number of cases, as the contaminants are then in a fixed position and the danger of diffusion is thus negligeable. However, if the soil is permeable, the contaminants may penetrate to a substantial depth into the soil. Removal of the contaminants by removal of the soil requires such a massive soil transportation, that such a solution is very expensive. Also, the the hole thus created has to be filled in with soil, which has to be supplied from elsewhere. The invention provides a method which is especially suitable for permeable soil, providing a substantial saving in expenses in comparison with the known methods.

The method according to the invention can be applied for both solid and liquid contaminants. As examples of solid contaminants are mentioned metal residues, either as such or in a bonded form; as examples of liquid contaminants, there may be mentioned certain organic solvents such as, for example, benzene and toluene, which are adsorbed in the soil.

The period of the extraction of the contaminated soil is not critical as the screening, provided it is not effected by freezing, has a static character and will remain stable for many years without any supervision. The extraction as such, once started, can be proceeded for any length of time with very limited supervision. Thus, for example in the case of a poisonous contamination, present in a concentration above the allowed maximum limit, the aim will be to lower said concentration within a short period of time to a level below said limit. The subsequent further removal of the contamination may then be deferred until some later time, or, if desired, be carried out at a much slower rate.

The extract obtained with the method according to the invention may, after being collected, be treated if desired according to a physical or chemical method, known in itself. This may, for example, consist of the treatment with a suitable absorption agent, whereafter the extracting agent may be recirculated for reuse. Thus, activated carbon may for example be used as absorption agent for an aqueous extract. The extracting agent may also be evaporated in a known manner and be recovered for reuse by condensation. The contaminant thus remaining may then be destroyed in a manner known as such, with or without prior regeneration, or being subjected to further conversion into other useful products. Thus, many metals, which can be isolated at a high pH by flocculation, may be used as such or after further treatment, for coloring of decorative tiles or floor-tiles. Possible formation of canals in the soil to be extracted can be compensated by local introduction of an extra well or source in the area of the canal formation.

It will be understood, that the purification as described hereinabove may also be carried out by transporting the contaminated soil towards a nearby pit of suitable dimensions, provided with the screening and wells or sources as described above. In view of the soil transport required, this method will only be used if made desirable or necessary as a consequence of particular local conditions.

What is claimed is:

1. A method for removing undesired components from the soil comprising:
   screening adjacent soil from contaminated soil having the undesired components therein,
   supplying an extracting agent, suitable for removing the undesired components, to the soil at a level above the contaminated soil,
   sucking up the extracted agent having the undesired components therein from the soil at a level below the contaminated soil.

2. A method according to claim 1, wherein the contaminated soil is simultaneously screened from the underlying soil.

3. A method according to claim 1, wherein the vertical screening extends 10–15 m below the ground level.

4. A method according to claim 1, wherein the extracting agent is sprinkled onto the surface of the soil and is sucked off at a level below the lower level of the contaminated soil.

5. A method according to claim 1, wherein the extract is purified by a known method, and the purified extracting agent thus obtained is recirculated.

6. A method according to claim 1, wherein the extracting agent consists of water, water with a decreased pH, water with an increased pH, ethanol, butanol, a mixture of ethanol and water, petroleum ether.

7. A process according to claim 1, wherein either one of the inside and the outside of the screening is lined with a completely covering, inert material.

8. A method according to claim 1, wherein the exterior of the screening wall is provided with a draining system for collecting any water and extracting agent which may ooze through the screening wall.

9. A method according to claim 1, wherein the volume of extracting agent amounts to 100–500 $l/m^2/day$.

10. A method for removing undesired components from the soil comprising,
    screening adjacent soil from contaminated soil having the undesired components therein,
    injecting an extracting agent, suitable for removing the undesired components, into the soil at a level below the contaminated soil, and
    removing the extracting agent having the undesired components therein from the soil at a level above the contaminated soil.

11. A method according to claim 10, wherein the extracting agent is removed from the surface of the soil.

* * * * *